3 Sheets—Sheet 1.
F. LECLERE.
Automatic Fire Extinguisher.
No. 202,035. Patented April 2, 1878.
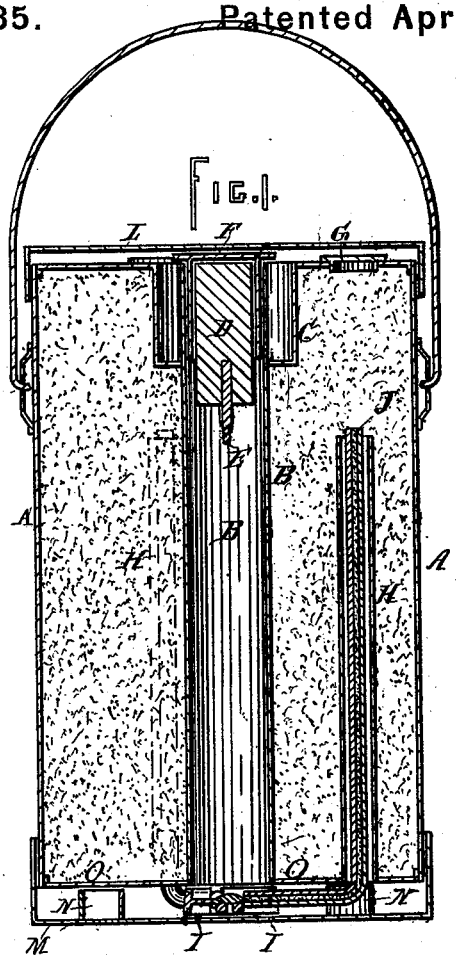
Fig. I.
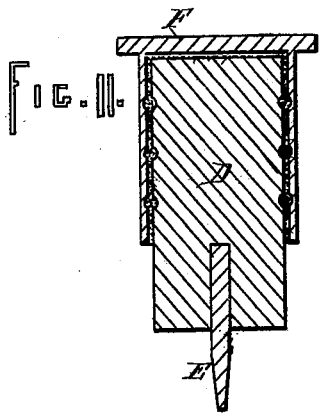
Fig. II.
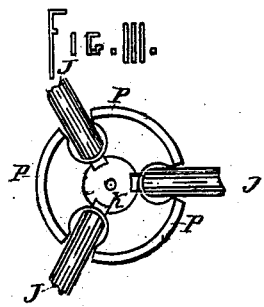
Fig. III.
Witnesses
H. V. Buckley
J. C. Steele
Inventor
Francis Leclere
per George E. Buckley
Atty
N. PETERS, PHOTO-LITHOGRAPHER, WASHINGTON, D. C.

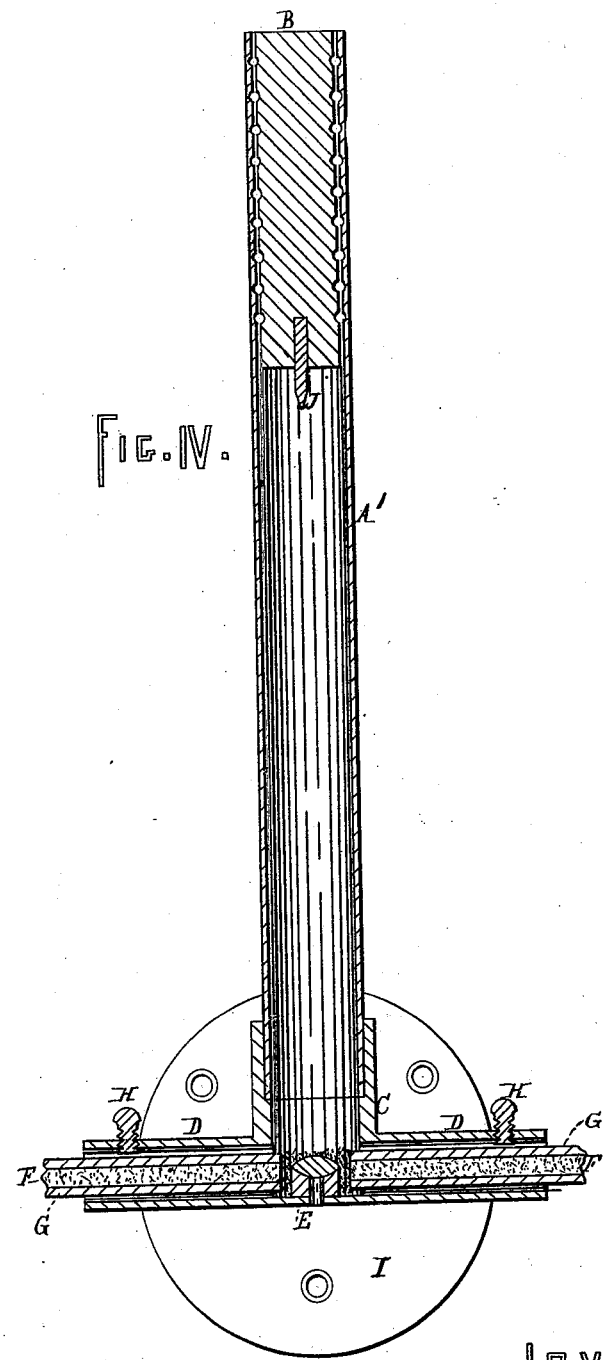

3 Sheets—Sheet 3.
F. LECLERE.
Automatic Fire Extinguisher.
No. 202,035. Patented April 2, 1878.
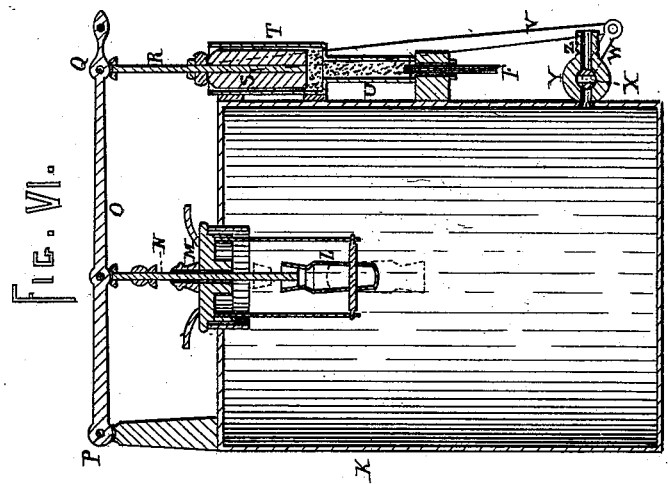
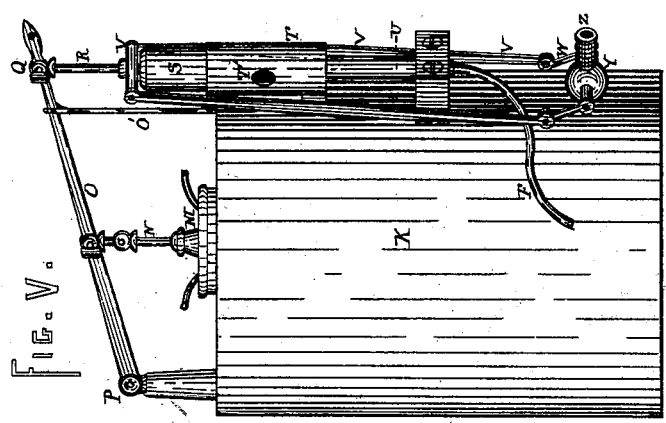
Witnesses
H. V. Buckley
J. C. Steele
Inventor
Francis Leclere
per George E. Buckley
atty.

UNITED STATES PATENT OFFICE.

FRANCIS LECLERE, OF PHILADELPHIA, PENNSYLVANIA, ASSIGNOR TO HIMSELF, GLAUCUS H. BONNAFFON, AND GEORGE E. BUCKLEY, OF SAME PLACE.

IMPROVEMENT IN AUTOMATIC FIRE-EXTINGUISHERS.

Specification forming part of Letters Patent No. 202,035, dated April 2, 1878; application filed January 17, 1878.

*To all whom it may concern:*

Be it known that I, FRANCIS LECLERE, of Philadelphia, State of Pennsylvania, have invented certain new and useful Improvements in Automatic Fire-Extinguishers; and I do hereby declare the following to be a full, clear, and exact description of the same, reference being had to the annexed drawings, making part hereof.

The object of the present invention is to provide buildings and other structures with a fire-extinguishing apparatus which shall be automatic in its action and still will not require the contact of actual flame for it to become operative in extinguishing the fire. This has heretofore been a serious defect in the operation of extinguishers, and I propose to obviate it by an apparatus which will go into operation when the temperature of an apartment in which it is located reaches a degree so far above that of summer-heat, or the desired heat from artificial heaters, as will preclude the danger of my apparatus "going off" at such ordinary temperature. I do this by combining with an apparatus containing any of the present well-known fire-extinguishing gases or compounds a thermostat, regulated to operate at a temperature of, say, 120° Fahrenheit, or thereabout, though any temperature may be selected. This thermostat is designed to impart a mechanical movement, which shall communicate directly or indirectly with the apparatus containing the material from which the extinguishing-gases are evolved. There are many ways of doing this. A wire or conductor may pass from the thermostat to the gas apparatus and open a valve in the latter, (say, the Babcock,) to start the generation of the gases therein, and at the same time may open an exit-passage for this gas and water into the room in which the gas apparatus is situated; or the mechanical action from the thermostat may light a fuse leading to the gas apparatus, and, by a slow or rapidly burning powder in the latter, force it open, and also open valves to start the production of the gases; or the fuse so lighted may be used to light one of the dry fire-extinguishing compounds now well known, such as Reec's, and thus evolve gases to extinguish the fire. The comparatively slight heat thus required to operate the thermostat will actuate the agencies for evolving the gases necessary for the extinguishment of the fire.

The advantages of a combination of this kind in the closed hold of a vessel, which is with difficulty approachable, will be readily apparent.

I am well aware that various devices have from time to time been set forth in printed publications, describing methods of freeing water so as to allow the same to flow in a building or apartment in case of fire, the water in these cases being forced to flow either by its own gravity from a cistern or from the street-main; but my invention is designed to perfect the mechanisms which have been recognized as the most efficacious in the extinguishment of fires—to wit, the various devices by which gases are liberated or evolved, either to act directly upon the flame, or to act thereon in combination with water, the gas, by its expansive power, being the agent by which the propulsion is effected. The various machines and devices included in this category are the Reec and Tenner compounds, the Babcock, Gardiner, and other fire-extinguishers.

The object of my invention being, as named above, the rendering of these devices automatic in their action, the heat of the fire, even without the necessity of contact with the flame, is made the indirect means of its extinguishment.

The nature of my invention will be shown by the following specification and claims.

To enable others skilled in the art to make and use my invention, I will describe its construction and operation.

In the drawings, Figure 1 represents a vertical cross-section of a combined thermostat and box of compound fire-extinguisher; Fig. 2, a similar detached view of the cap of the thermostat and the weight and needle; Fig. 3, a plan view of the anvil or rest for the fulminate and the ends of three converging fuses; Fig. 4, a detached vertical section of a thermostat, anvil, fulminate, and the ends of the two fuses; Fig. 5, an elevation of a Babcock extinguisher, showing the application thereto of an apparatus which, operated by the fuses from the thermostat and a charge of powder, will automatically generate gases for the extinguishment of fire; Fig. 6, a vertical cross-sectional view of the same.

The apparatus shown in Figs. 1, 2, and 3 constitutes one means of carrying my invention into practice, and I will describe it in detail.

A is an outer case, consisting of tin, sheet-iron, or any other desirable and suitable material. B is a central core or tube, passing from the bottom to the top of the case, and surrounded at its top by an annular chamber, C, which forms a gallery around it, entirely inclosed, however, from the inner space of the case.

D is a weight, of lead or iron, having sunk into its lower end a needle or point, E, and it is held suspended from the cap F, which cap is serrated or roughened upon its inner cylindrical sides, and the weight is serrated or roughened upon its outer surface, or has annular grooves upon it, as shown, opposite, when the weight is in position, to corresponding grooves upon the inner surface of cap F. The weight fits loosely in this cap, but is held firmly there by means of a composition of tallow and stearine, or any other substance or compound which is adapted to melt at a desired temperature. This composition is poured around between the weight and the walls of the cap F, and as it hardens into the depressions of the opposing rough surfaces of the weight and cap holds the weight firmly in place. This cap has a flanged top, as shown in Fig. 2, and is suspended in the upper part of the tube B in case A by this flange resting upon the upper edge of said tube, as in Fig. 1.

G are small caps, closing ports in the top of case A, cemented thereto by the same fusible composition used to cement weight D in cap F. These cements will melt at the same heat.

H H are upright tubes, for sustaining fuses J in the midst of the compound in case A, and to guide the fuses to the upper part of the compound. I is an anvil or fulminate-block, situated upon bottom M of case A, directly beneath and at the bottom of tube B. J is the fuse; K, a depression in anvil I, to hold a wafer of fulminate.

The anvil I is surrounded with a short upwardly-projecting flange, P, to sustain gunpowder to cover the fulminate with, so as to insure ignition of fuses J J J, which terminate at the fulminate.

L is a lid to case A, to protect it in shipment. M is a lower cap, forming a false bottom on case A, leaving a space between it and the bottom O. The bottom O sustains the chemical fire-extinguishing compound within case A, and also the tubes B and H. The bottom O sustains and has secured to it the tubes B and H.

N are lugs secured to bottom M, which, by projecting upward and impinging against the bottom O, keep the false bottom M from crowding upward and jamming the anvil and fuses. There are three fuses and three fuse-tubes, H.

The compound (shown in dots in the drawing) in case A is the compound described as Reec's compound, and also described in Budy's patent, No. 191,306. Any fire-extinguishing dry compound which can be made to evolve gases by ignition may be used. I first set the fuses J J J in tubes H H, so that the fuse projects, as in Fig. 1, up into the upper part of the interior space of case A; then through the ports G, which are open for this purpose, I fill in the compound, either in lumps or powder. This powder is Budy's patent, described as containing twenty parts of chlorate of potash, ten parts of rosin, fifty parts of nitrate of potash, fifty parts of sulphur, and one part of peroxide of manganese. These substances are moistened with a solution of silicate of soda. The compound is then pressed into blocks or powdered. If the ports G are too small to receive the compound in blocks, it may be inserted in the case before the top is put on, or through an opening in the top provided for it, which should be afterward closed; or it may be pressed, in suitable molds, into blocks to fit case A and tubes B and H, and be inserted before the top is put on. After this is done, a small wafer of fulminating compound is placed upon the anvil I in depression K, and preferably surrounded with gunpowder. This fulminate and powder, or either, may be applied in a moist state, so as not to fall out of place; or both may be made in blocks of a suitable shape to fit the depressions where they will be placed in the apparatus.

In Fig. 3 the three fuses converge and have their ends at this fulminate, and pass thence up through tubes H into the space containing the compound. The cap F, containing weight D, is then set in place in the upper part of tube B. This weight D is thus held suspended directly over the fulminate of the anvil I below, and is only restrained from falling by the wax or compound of stearine and tallow which holds it in cap F. The caps G are then placed over the ports, and cemented in place by the same compound as is used to hold the weight in cap F. The lid L is then placed on the apparatus, and it is ready for shipment.

When it is desired to protect an apartment from fire, the lid L is removed, and the case A, so prepared, is placed on a shelf, or in any convenient place therein. When the temperature of the apartment then rises to, say, 120° Fahrenheit, the composition which holds the weight D is melted, and the weight D, being then unsustained, falls of its own gravity downward, and is prevented from tumbling by the tube B, in which it fits, and its needle E with great force pierces the fulminate upon anvil I, thus exploding the fulminate, igniting the fuses J J J, and fire is thus, by means of these fuses, communicated to the compound in the interior of case A.

It is noticeable that the ignition of this compound takes place near its top, and the gases resultant from its ignition are thus allowed to escape freely. The caps which cover ports G, having been freed by the melting of the compound which cemented them, are thereby let loose, and as the gases are evolved in the space below the force of their expansion throws up these light caps G, and the gases escape in continuous volumes into the apartment. The ignition having taken place in the upper part of the mass of compound, the gas escapes as it is formed, and the ignition continues until the whole mass of compound is consumed. The gases thus evolved will extinguish the flame which generated the heat to start the apparatus.

The compound which I use to cement the weight D and lids G, I prepare in about the following proportions, to melt at 120° to 125° Fahrenheit: one part of tallow, two of beeswax, and four of stearine, or two of beeswax, and five of stearine. By adding tallow, the melting-point is lowered; by adding wax, it is increased; for tallow melts at about 92°, spermaceti at 112°, stearine at 135°, bees-wax 151°, Fahrenheit. I add about ten per cent. of camphor to this compound, to increase its fluidity when melted, so that when the composition melts the weight D will shoot down clear of it at once, and not drag with nor be clogged by partially-melted composition.

The proportions can be varied to suit any degree at which it is desired that the composition should melt.

It will be readily seen that the box containing the extinguishing compound need not be contiguous to the actuating tube or thermostat B D, but may be removed to some distance, and connected therewith by the fuses J. The anvil I, Fig. 3, has slots in it to receive the ends of the fuses and to hold them in place.

The tube of cap F can, if desired, be so constructed as to slide up and down in the upper end of tube B, so that when the apparatus is set to be in readiness for working it can be pulled up so far as to rise above the top of case A, thus exposing its sides more to the action of the heat, making it more sensitive, and increasing the distance to be traversed by weight D, thus increasing the force of its descent toward the fulminate below.

The upper part of tube B, within the annular chamber C, may be perforated, to permit free access of heat to the cap or tube F; also to permit the entry of air behind the weight as it is falling, so that no vacuum will be created behind it to retard its fall. This cap F may also be perforated, or may be made of wire-gauze, to expose the melting composition.

Cap F can be held higher up in the tube B by having a ring or stud soldered to its outer convex cylindrical surface at the point at which it is desired to hold it.

The tube of cap F may be made so long as to pass below the point at which the weight is held, and may be longer than tube B, so as to rest below upon the anvil I, projecting above the top of case B.

In Fig. 4 I show an apparatus constructed upon the same general principle as that shown, in the tube B, cap F, weight D, anvil I, and fuses J of Figs. 1, 2, and 3; but it is intended for and adapted to be detached from the immediate vicinity of the box or case containing the extinguishing compound; and the fuses leading from it may be used to ignite such a compound, or to automatically start the production of gas in any fire-extinguishing apparatus, such as the Babcock, Gardiner, or others. In said Fig. 4, A' is the tube for guiding the descent of the weight B, having the needle J. This weight is secured in the upper part of tube A' in the same manner as that in cap F of Figs. 1 and 2. C is an upwardly-projecting short cylinder, to receive the lower end of tube A. D D are two opposite horizontal tubes, to hold the ends of fuse. E is the anvil, supporting the cake or wafer of fulminate. It has a hole through it, as in anvil I of Figs. 1 and 3, to receive the point of the needle J as it comes through the fulminate, in the same manner as in the needle-gun. F F are two fuses, terminating in tube D, close to the anvil E, in a small charge of gunpowder, which also covers the fulminate and anvil. G G are two holders or short tubes, through each of which the inner end of a fuse, F, passes, and are held in place in tubes D D by set-screws H H. I is a plate or disk, cast in one piece with the parts C and D D, and is pierced with holes, to permit it to be screwed to a wall or column. J is the needle of weight B. This apparatus forms a thermostat, which can, as in Fig. 1, be set to operate at any desired temperature, and one or a number of them can be set in an apartment or in the hold of a vessel, and can be connected by means of fuses F F with a case or cases containing an extinguishing compound, as above described. They may be united in a system—that is, a number of these thermostats can be so connected to one or more cases containing said compound, and these cases can be connected with each other by fuses in the same way. The operation of any one thermostat in an apartment can in this way be made to fire the whole system of cases of extinguishing compound. The melting of the waxy composition which holds the weight B in place will allow the weight to precipitate itself downward. Its needle J will pierce the fulminate upon anvil E, fire the gunpowder, start the fuses F F, which, in turn, will ignite the contents of the boxes or cases with which they are connected, and so gases will be generated and evolved to extinguish the fire, the heat of which causes the melting of the waxy composition.

If, instead of this extinguishing compound, it is desired to automatically operate a Babcock fire-extinguisher it is done in this wise, viz: Figs. 5 and 6 show an elevation and a cross-sectional view of a Babcock fire-extinguisher. I will describe the application of my apparatus to this extinguisher; but it is not necessary here to detail the special construction of the Babcock or Gardiner; but I will describe a manner of connecting my apparatus therewith, whereby the Babcock or Gardiner will operate and discharge gases or water.

The special construction of these machines is set forth in numerous patents and publications, and from their general introduction into public use they require no such description; but my details will enable those skilled in the art to make and use my invention, and to devise other equivalent methods of carrying it into effect, as numerous agencies can easily be devised to apply the power transmitted by the fuses F F to these apparatuses. In these Figs. 5 and 6, I show a Babcock.

K is the outer case; L, the bottle containing acids, supported near its bottom on trunnions in the usual way. Its stopper upon the end of rod N seals it and holds it upright. The rod N is jointed above to lever O, which is pivoted at P. The outer end of this lever is jointed at Q to a piston, R, which terminates below in a weight or head, S, which fills up and fits the upper part of chamber T, and is adapted to slide freely up and down in this chamber, while it fits closely in it. The lower part of chamber T and its continuation U is filled with a slow-burning powder, like rocket-powder; and into the lower part of chamber U is introduced one end of fuse F, held firmly there by passing tightly through a block, which forms the bottom of this latter chamber.

O' is a spring-rod, set in the top of case K, and having upon it, on the side traversed by lever O in rising, a small catch or projection, beveled on its lower side. V W are jointed rods, connected above by a joint with piston R, and below with a spigot or valve, X, situated in nozzle Y Z. T' are openings in the sides of chamber T, just below the point which will be reached by the bottom of head or weight S in rising to permit the escape of gases generated by the explosion of the powder in chambers T and U. Carbonic-acid gas is generated by the tilting of the acid contents of the bottle L upon chemicals below in the interior of case K.

When the thermostat, Fig. 4, communicates fire to the fuse F, this fuse explodes the powder in chambers T and U. The gases resulting from this explosion raise the head S, and escape through openings T'. The raising of head S forces up piston R, lever O, and raised rod N, which extracts its lower end (the stopper) from bottle L, and this bottle turns upside down, as shown in dotted lines in Fig. 6. The bottle, then being only supported below its center by its trunnions, falls over, as aforesaid, and pours its contents over the chemicals below, thus generating carbonic-acid gas. Meantime the raising of piston R draws up rods V from the position shown in Fig. 6 to that shown in Fig. 5. The lower rod W, being rigidly attached to the valve-shaft, turns it, and the valve X is opened, to permit the escape of gas or water through nozzle Z. This valve is kept open by the action of rod O', which, by its catch, holds up the lever O. The water or gases then continue to escape through nozzle Z, and the apartment in which the apparatus is placed is filled therewith, which extinguishes any fire therein.

I prefer to carry the fuse to the vicinity of the apparatus to be worked, because if the motion resultant from the explosion is transmitted by a wire it is not so reliable, because dependence cannot always be placed upon its proper transmission; for it may be necessary to carry the wire into the quirks and turns of cornices or corners in apartments; and the connections may not operate properly; and if a battery and wire are used, constant attention has to be paid to the battery to keep it in working order; the insulation must be looked after, and inspected from time to time. But a fuse properly set in the first case is always ready for action. I use the fuse, the core of which only burns, so no sparks are scattered by it in transmitting the fire.

The other thermostats patented before this, and in common use for fire-alarms and other purposes, cannot be depended upon, as they are not sure to operate at about the precise temperature desired.

Having thus described my invention, what I claim as new, and desire to secure by Letters Patent, is—

1. The combination, with a box or case containing chemicals for evolving gases for the extinguishing of fires, of a thermostat, which, when operated by heat, will light a fire to free the gases in such case, substantially as described.

2. The combination of a thermostat with fulminate and a fuse, the former being so arranged as to drop a weight to ignite the fulminate and fire the fuse, substantially as and for the purposes described.

3. The combination of a thermostat with a box or case containing chemicals which, by ignition, will evolve gases to extinguish fires, the former being arranged to actuate a mechanism, substantially as described, to light the said chemicals, substantially as and for the purposes set forth.

4. The combination of a thermostat, B D, constructed as described, fulminate-base I, to receive the fulminate, and case A, to hold the chemicals to be ignited, substantially as described.

5. An apparatus, Fig. 1, for the extinguishment of fires, formed of the combination of case A, to contain the extinguishing compound-tube B within the same, weight D held suspended in said tube by a waxy compound, fulminate-base, I, the explosion of the fulminate upon which will fire the extinguishing compound, substantially as and for the purposes described.

FRANCIS LECLERE.

Witnesses:
ANDREW LANE, Jr.,
H. V. BUCKLEY,
CHAS. F. VAN HORN.